March 2, 1943.  S. C. HOARE  2,312,904
POWER FACTOR METER
Filed July 8, 1941   2 Sheets-Sheet 2

Inventor:
Stephen C. Hoare,
by Harry E. Dunham
His Attorney.

Patented Mar. 2, 1943

2,312,904

UNITED STATES PATENT OFFICE 2,312,904

POWER FACTOR METER

Stephen C. Hoare, Manchester, Mass., assignor to General Electric Company, a corporation of New York Application July 8, 1941, Serial No. 401,421

6 Claims. (Cl. 172—245)

My invention relates to power factor meters and its object is to provide a power factor meter having a long scale that is a power factor scale reading through a range from zero lagging to zero leading power factor and extending over an arc appreciably more than 180 degrees.

In a preferred embodiment of my invention I provide two power factor responsive elements operating on the same shaft, one being a conventional type of power factor measuring element which alone is limited to a 180 degree scale range, and the other an element having zero torque at unity power factor but progressively increasing torques at lower power factors reaching maximum torques at zero power factors and having a deflection range of the order of 130 degrees each side of unity power factor. The result is a power factor measuring device having good torque at all power factors and a deflection range appreciably more than 180 degrees.

Figure 1:
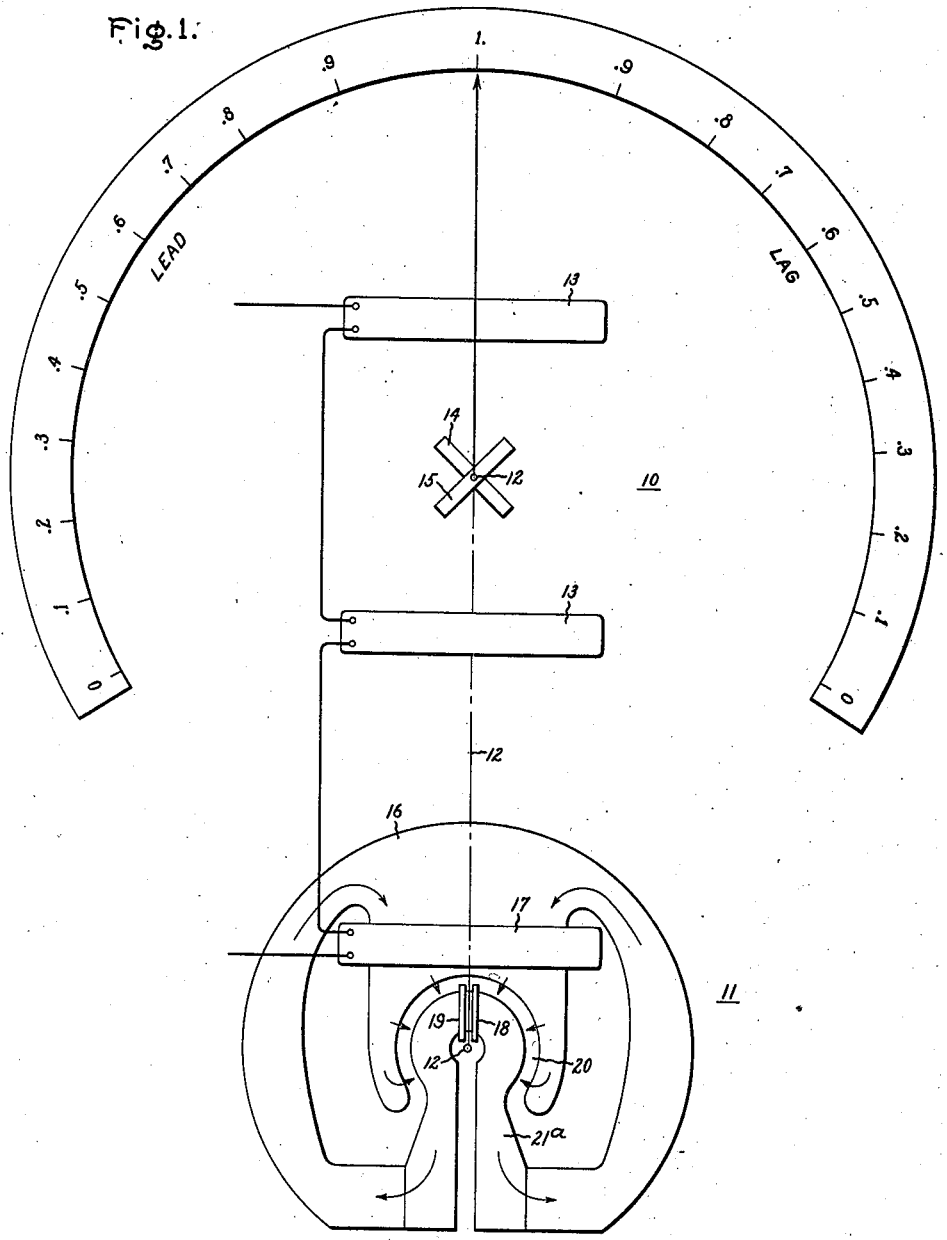
Figure 2:
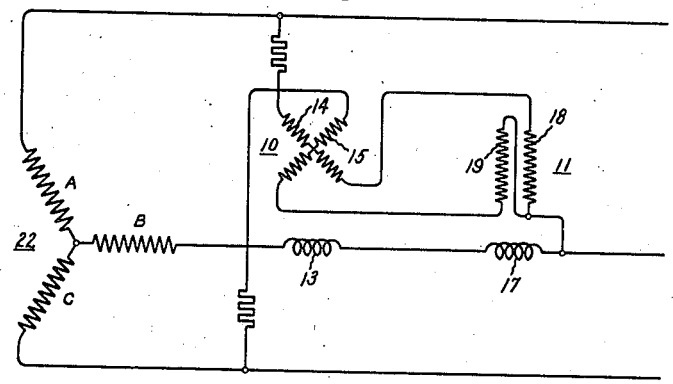
Figure 3:
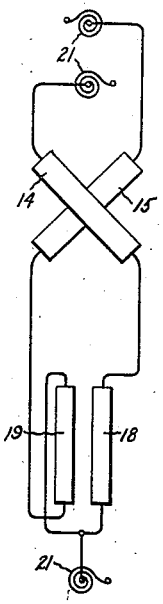
Figure 4:
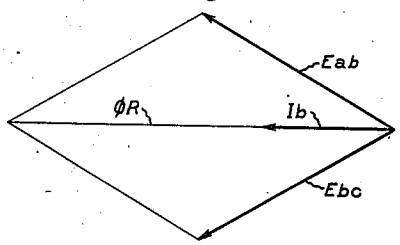
Figure 5:
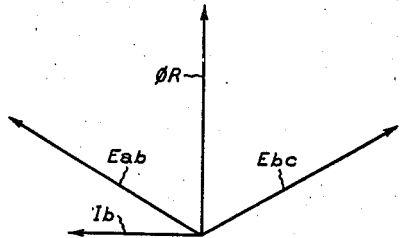

The features of my invention which are believed to be novel and patentable will be pointed out in the claims appended hereto. For a better understanding of my invention reference is made in the following description to the accompanying drawings in which Fig. 1 is a schematic representation of my power factor meter with the two elements thereof shown in elevation; Fig. 2 is a wiring diagram showing the connections of the meter; Fig. 3 represents the electrical connections between the moving coil systems; and Figs. 4 and 5 are vector diagrams pertaining respectively to the upper and lower elements shown on Fig. 1.

Referring now to Fig. 1, my meter comprises two power factor responsive elements designated 10 and 11. The moving armature coil systems of these two elements are mounted on the same vertical shaft 12, the shaft connection being represented by the broken line 12. It will be understood that for illustration purposes plan views are shown of both elements 10 and 11 and that in an actual plan view element 11 would be partially hidden beneath element 10. The upper element 10 is a conventional power factor measuring element having a stationary current coil system 13 and a cross coil moving system comprising coils 14 and 15. The lower element 11 has a stationary magnetic circuit 16 energized by a current coil 17 and a moving coil system comprising coils 18 and 19 in fixed coaxial relation to each other on shaft 12. An annular air gap 20 is formed in the magnetic circuit 16 extending over an arc of about 250 degrees in which the outer edges of coils 18 and 19 swing about the shaft 12 as an axis. The inner pole piece 21a of the magnetic circuit is of annular form with its center cut out to accommodate the shaft and the inner sides of the coils 18 and 19. The flux produced by coil 17 in the magnetic circuit 16 passes radially across the annular air gap 20 and is distributed throughout such air gap as indicated by arrows. A meter element having a magnetic circuit of this character is described in United States Letters Patent 2,210,778, August 6, 1940, to Rowell.

The stationary windings 13 and 17 of the two elements are line current windings and are connected in series. The movable windings comprising coils 14, 15, 18 and 19 are energized in accordance with line voltage conditions through suitable flexible spiral connectors 21, Fig. 3, which connectors are arranged to impose no torque on the shaft. As indicated in Figs. 2 and 3, coils 14 and 18 are connected in series and coils 15 and 19 are connected in series but with coil 19 connected in reversed relation.

The line connections are represented in Fig. 2 for the power factor measurement of a three phase system supplied by a generator indicated at 22. As represented, the stationary current field windings 13 and 17 are connected in series with line phase B. The voltage windings 14 and 18 are connected across phases A and B and the voltage windings 15 and 19 are connected across phases B and C.

At unity power factor the vector relations of element 10 may be represented as in Fig. 4 where $Ib$ may represent the phase relation of the flux produced by winding 13 due to the line current in phase B, $Eab$ the phase relation of the flux produced by coil 14 and $Ebc$ the phase relation of the flux produced by coil 15. The phase relation of the resultant flux of coils 14 and 15 designated $\phi R$ is in phase with the current flux vector $Ib$ and this is the condition of maximum torque for element 10. It is evident that if the power factor changes to zero either in a leading or lagging direction the current vector $Ib$ will be shifted 90 degrees from vector $\phi R$ in one direction or the other and the torque of the element 10 becomes zero and reaches the limit of its deflection range. Thus using element 10 alone the power factor scale is limited to 180 degrees.

Fig. 5 represents the corresponding vector relations for element 11 at unity power factor. $Ib$ representing the flux vector of the current flux produced by coil 17, $Eab$ the voltage flux vector for coil 18 and $Ebc$ the voltage flux vector for coil 19, vector $Ebc$ is reversed from its position in Fig. 3 because of the relatively reversed connection of coil 19. In element 11 it is seen that the resultant voltage flux vector φR is 90 degrees out of phase with the current flux vector Ib at unity power factor and hence under this condition, element 11 has no torque. If the power factor shifts from unity in a lagging direction, the moving coil system of element 11 will have a torque in one direction, and if the power factor shifts from unity in the opposite direction, element 11 will have a torque in the opposite direction. The moving coil elements are secured to the shaft 12 in the relative positions shown in Fig. 1 which represents the unity power factor position. The position of the moving coil system at unity power factor is determined by element 10 and is the central position shown in Fig. 1. Theoretically element 11 will have torque over a 180 degree range each side of such central position but due to the fact that it would move out of the flux air gap 20, Fig. 1, its torque range is limited to about 125 degrees from the central position.

It is seen now that there is a desirable overlapping of the torques of the two elements because their maximum torques occur at different power factors and hence at different times and predominate to control the deflection over different parts of the scale. The maximum torque of element 10 may be of the order of 35% of the maximum torque of element 11. Near unity power factor the deflection is controlled primarily by element 10 and at lower power factors primarily by unit 11. As a result, the deflection range is extended and spread over an angle of the order of 250 mechanical degrees for power factors from zero through the lag and lead ranges including unity power factor to zero again. Also, that part of the power factor scale which is generally the most useful, namely above .5 power factor, is greatly expanded as compared to the scale of the conventional power factor meter. A typical scale distribution for my meter is represented in Fig. 1. The scale distribution may be modified by varying the relative torques of the two elements 10 and 11 and by varying the angle between the coils 14 and 15 of element 10. Also the scale distribution may be made unsymmetrical with respect to the unity power factor point by changing the rotary position of one of the moving elements with respect to that of the other on the shaft.

What I claim as new and desire to secure by Letters Patent of the United States, is:

1. A power factor meter comprising two power factor responsive instrument elements each having stationary and rotative parts, one element producing maximum torque in the vicinity of unity power factor and having minimum torques in the vicinity of zero power factor lagging and leading and the other element producing maximum torques in the vicinity of zero power factor leading and lagging and having zero torque in the vicinity of unity power factor, a common shaft to which the rotative parts of both elements are secured such that when both elements are connected to measure the power factor of the same circuit their maximum torque positions corresponds to rotary positions of the shaft which are in excess of 90 angular degrees apart.

2. A power factor meter having a power factor scale which exceeds 90 angular degrees in length for a power factor variation between unity and zero, a pointer indicating on said scale and two movable power factor responsive instrument elements for moving said pointer over said scale, one element for controlling the movement of said pointer for power factor variations in the vicinity of unity and the other for controlling the movement of said pointer in the vicinity of zero power factors.

3. A power factor meter having a power factor scale graduated from zero lagging through unity to zero leading and extending over an angular arc of the order of 250 degrees, a pointer indicating on said scale, and power factor responsive means for moving said pointer over said scale in response to power factor changes over the range indicated on said scale comprising two power factor responsive instrument elements both having a rotary part which jointly control the movement of said pointer, said elements having their maximum torques at widely different power factors and one having a power factor range of deflection extending beyond the power factor deflection range of the other.

4. A power factor meter comprising two power factor responsive instrument elements each having rotary and stationary parts, said elements having their maximum torques at appreciably different power factors and having appreciably different angular deflection ranges for a given change in power factor, means for energizing both instrument elements to respond to the power factor of the same circuit and a shaft to which the rotary parts of both elements are secured so that their maximum torque positions correspond to rotary positions of the shaft in excess of 90 angular degrees apart.

5. A long scale power factor meter comprising a pair of power factor responsive elements each having rotary and stationary parts, a shaft to which each of the rotary parts are secured, connections for energizing said instruments from the circuit to be metered, one instrument being capable of rotating said shaft over approximately 180 degrees and having its maximum torque in the vicinity of unity power factor and the other instrument being capable of rotating said shaft approximately 125 degrees in opposite directions from a position corresponding to unity power factor and having maximum torques in the vicinity of zero power factor leading and zero power factor lagging, the relatively rotary positions of the rotary parts of said instruments being such that their maximum torque positions occur for rotary positions of said shaft which are in excess of 90 degrees from each other.

6. A power factor meter comprising a pair of power factor responsive instruments each having stationary field and a pair of rotary coils, current connections for energizing the fields in series from the circuit to be metered, voltage connections for energizing one coil of each instrument in series and another voltage connection for energizing the other coil of each instrument in series from the circuit to be metered, a shaft to which the rotary coils of each instrument are secured, such that the rotary position of said shaft is jointly controlled by both instruments, a power factor scale of the order of 250 degrees and graduated in power factor units from zero lagging, through unity, to zero leading, and a pointer secured to said shaft and movable over said scale by said instruments in response to power factor variations of the circuit to be metered as indicated by said pointer on said scale.

STEPHEN C. HOARE.